United States Patent
Park

(10) Patent No.: US 10,365,527 B2
(45) Date of Patent: Jul. 30, 2019

(54) LIQUID CRYSTAL DISPLAY DEVICE AND LIQUID CRYSTAL DISPLAY PANEL

(71) Applicant: LG Display Co., Ltd., Seoul (KR)

(72) Inventor: JuUn Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/708,817

(22) Filed: Sep. 19, 2017

(65) Prior Publication Data

US 2018/0088424 A1  Mar. 29, 2018

(30) Foreign Application Priority Data

Sep. 29, 2016 (KR) ........................ 10-2016-0125710

(51) Int. Cl.
| G02F 1/13 | (2006.01) |
|---|---|
| G02F 1/1335 | (2006.01) |
| G02F 1/1343 | (2006.01) |
| G02F 1/1362 | (2006.01) |
| G09G 3/36 | (2006.01) |
| G09G 3/20 | (2006.01) |

(52) U.S. Cl.
CPC .. *G02F 1/136286* (2013.01); *G02F 1/133514* (2013.01); *G09G 3/2003* (2013.01); *G09G 3/3607* (2013.01); *G09G 3/3648* (2013.01); *G09G 3/3688* (2013.01); *G02F 2201/52* (2013.01); *G09G 2300/0426* (2013.01); *G09G 2300/0452* (2013.01); *G09G 2300/0842* (2013.01); *G09G 2310/0286* (2013.01); *G09G 2320/0233* (2013.01); *G09G 2320/0626* (2013.01)

(58) Field of Classification Search
CPC .......... G02F 1/133514; G02F 2201/52; G09G 3/3648; G09G 3/3607
See application file for complete search history.

(56) References Cited

U.S. PATENT DOCUMENTS

| 5,142,392 | A  * | 8/1992 | Ueki ................. | G02F 1/133512 349/106 |
|---|---|---|---|---|
| 7,259,812 | B2 * | 8/2007 | Park .................. | G02F 1/134363 349/106 |
| 2005/0275610 | A1 * | 12/2005 | Roh ..................... | G09G 3/3614 345/88 |
| 2012/0306732 | A1 * | 12/2012 | Sugihara ........... | G02F 1/134336 345/88 |

* cited by examiner

*Primary Examiner* — Nan-Ying Yang
(74) *Attorney, Agent, or Firm* — Polsinelli PC

(57) ABSTRACT

The present disclosure relates to a liquid crystal display panel and a liquid crystal display device including red, white, blue, and green liquid crystal cells in regions where two or more data lines and two or more gate lines intersect each other. In at least a portion of the liquid crystal display panel, an arrangement of the liquid crystal cells in the data line direction and the gate line direction is repeated.

15 Claims, 9 Drawing Sheets

LIQUID CRYSTAL DISPLAY DEVICE AND LIQUID CRYSTAL DISPLAY PANEL

CROSS REFERENCE TO RELATED APPLICATION

This application claims priority from Korean Patent Application No. 10-2016-0125710, filed on Sep. 29, 2016, which is hereby incorporated by reference in its entirety for all purposes as if fully set forth herein.

BACKGROUND

Field of the Disclosure

The present disclosure relates to a display device, and more particularly, to a liquid crystal display device that displays an image.

Description of the Background

A liquid crystal display device displays an image by controlling the light transmittance of a liquid crystal layer through application of an electric field to the liquid crystal layer in response to a video signal.

Such a liquid crystal display device is a flat panel display device having advantages of miniaturization, reduced thickness, and low power consumption, and is used in a portable computer such as a notebook PC, an office automation device, an audio/video device, and the like.

Such a liquid crystal display device includes a gate drive integrated circuit for driving gate lines (GLs) and a data drive integrated circuit for driving data lines (DLs).

As a liquid crystal display device is enlarged and a resolution of the liquid crystal display device is improved, the number of drive integrated circuits (ICs) that are required is increasing. However, since the data drive ICs are relatively expensive compared to other devices, various methods for reducing the number of data drive ICs have recently been proposed.

SUMMARY

The present disclosure is to provide a liquid crystal display (LCD) device and an LCD panel capable of reducing the number of data drive ICs used in a data driver by reducing the number of data lines.

In an aspect of the present disclosure, a liquid crystal display device includes: a liquid crystal display panel including red, white, blue, and green liquid crystal cells in m*n regions (m is a natural number that is a multiple of 3 and n is a natural number), in which m/3 data lines and 3n gate lines intersect each other; and a controller configured to control driving of the liquid crystal cells through the data lines and the gate lines.

In at least a portion of the liquid crystal panel, an arrangement of 4*2 liquid crystal cells in the data line direction and the gate line direction may be repeated according to Equation 1.

$$\begin{bmatrix} X1 & X2 \\ X3 & X4 \\ X2 & X1 \\ X4 & X3 \end{bmatrix} \quad \text{Equation 1}$$

In Equation 1, the horizontal direction is the data line direction, the vertical direction is the gate line direction, and X1, X2, X3, and X4 indicate that the color of a color filter is any one of red, white, blue, and green.

In another aspect of the present disclosure, a liquid crystal display panel includes: a liquid crystal display panel comprising: m*n liquid crystal cells (m is a natural number that is a multiple of 3 and n is a natural number), which are respectively arranged in m*n regions where m/3 data lines and 3n gate lines intersect each other on a first substrate; and red, white, blue, and green color filters, which are disposed on a second substrate to correspond to the liquid crystal cells, respectively.

At least some of the color filters may be repeated in an arrangement of 4*2 color filters in the data line direction and the gate line direction according to Equation 1A.

$$\begin{bmatrix} X1 & X2 \\ X3 & X4 \\ X2 & X1 \\ X4 & X3 \end{bmatrix} \quad \text{Equation 1A}$$

In Equation 1A, the horizontal direction is the data line direction, the vertical direction is the gate line direction, and X1, X2, X3, and X4 indicate that the colors of the color filters are red, white, blue, and green, respectively.

In a further aspect of the present disclosure, a liquid crystal display panel includes a plurality of liquid crystal cells in m×n regions where m is a multiple of 3 and n is a natural number; m/3 data lines and 3n gate lines intersecting each other at the m×n regions of the liquid crystal cells; a plurality of red, white, blue and green color filters corresponding to the liquid crystal cells, wherein at least either the liquid crystal cells or the color filters are arranged in a pattern of 4×2 to a data line direction parallel to a horizontal direction and a gate line direction perpendicular to the data line direction and the pattern is repeated in at least a portion of the liquid crystal display panel according to Equation 1, $$\begin{bmatrix} X1 & X2 \\ X3 & X4 \\ X2 & X1 \\ X4 & X3 \end{bmatrix} \quad \text{[Equation 1]}$$

wherein X1, X2, X3, and X4 respectively indicate one of red, white, blue, and green colors of the liquid crystal cells or the color filters.

In a liquid crystal display device and a liquid crystal display panel according to the present disclosure, the number of data drive ICs used in a data driver is reduced by reducing the number of data lines.

BRIEF DESCRIPTION OF THE DRAWINGS

The above features and advantages of the present disclosure will be more apparent from the following detailed description taken in conjunction with the accompanying drawings, in which.

DETAILED DESCRIPTION

Figure 1:
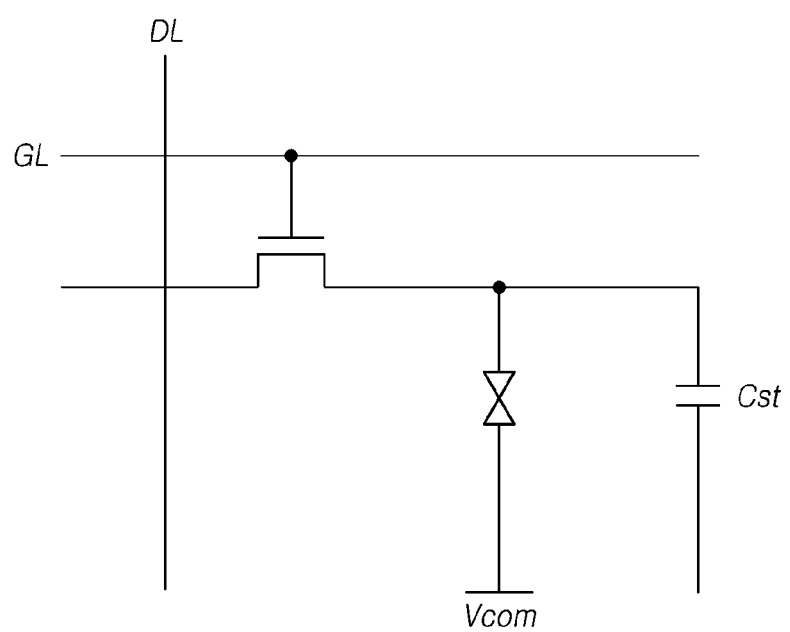
FIG. 1 is a diagram illustrating a configuration of a unit cell of an LCD device.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Configuration of LCD Device

FIG. 1 is a diagram illustrating a configuration of a unit cell of an LCD device.

As illustrated in FIG. 1, an active matrix-type LCD device converts digital video data into an analog data voltage on the basis of a gamma reference voltage and supplies the analog data voltage to a data line DL, and simultaneously applies a scan pulse to a gate line GL, so as to charge a liquid crystal cell Clc with the data voltage.

To this end, a gate electrode of a thin film transistor (TFT) as a switching element is connected to the gate line GL, one of the source electrode and the drain electrode of the TFT is connected to the data line DL, and the remaining one of the source electrode and the drain electrode of the TFT is connected to the pixel electrode of the liquid crystal cell Clc and one electrode of a storage capacitor Cst1.

A common voltage Vcom is supplied to the common electrode of the liquid crystal cell Clc. A storage capacitor Cst1 functions to maintain the voltage of the liquid crystal cell Clc constant by charging the data voltage applied from the data line DL when the TFT is turned on.

When a scan pulse is applied to the gate line GL, the TFT is turned on, so as to arrange a channel between the source electrode and the drain electrode, thereby supplying the voltage on the data line DL to a pixel electrode of the liquid crystal cell Clc.

At this time, the arrangement of the liquid crystal molecules of the liquid crystal cell Clc is changed by the electric field between the pixel electrode and the common electrode, thereby causing incident light variable.

As the LCD display is enlarged and a resolution of the liquid crystal display device is improved, the number of drive ICs constituting a required data drive unit increases. As described above, since the data drive ICs are relatively expensive compared to other devices, various methods for reducing the number of data drive ICs have recently been proposed.

An LCD device according to an aspect disclosed herein provides an LCD device and an LCD panel that implement the same resolution as a general LCD device, even though the number of data drive ICs is reduced compared to a general LCD device.

Figure 2:
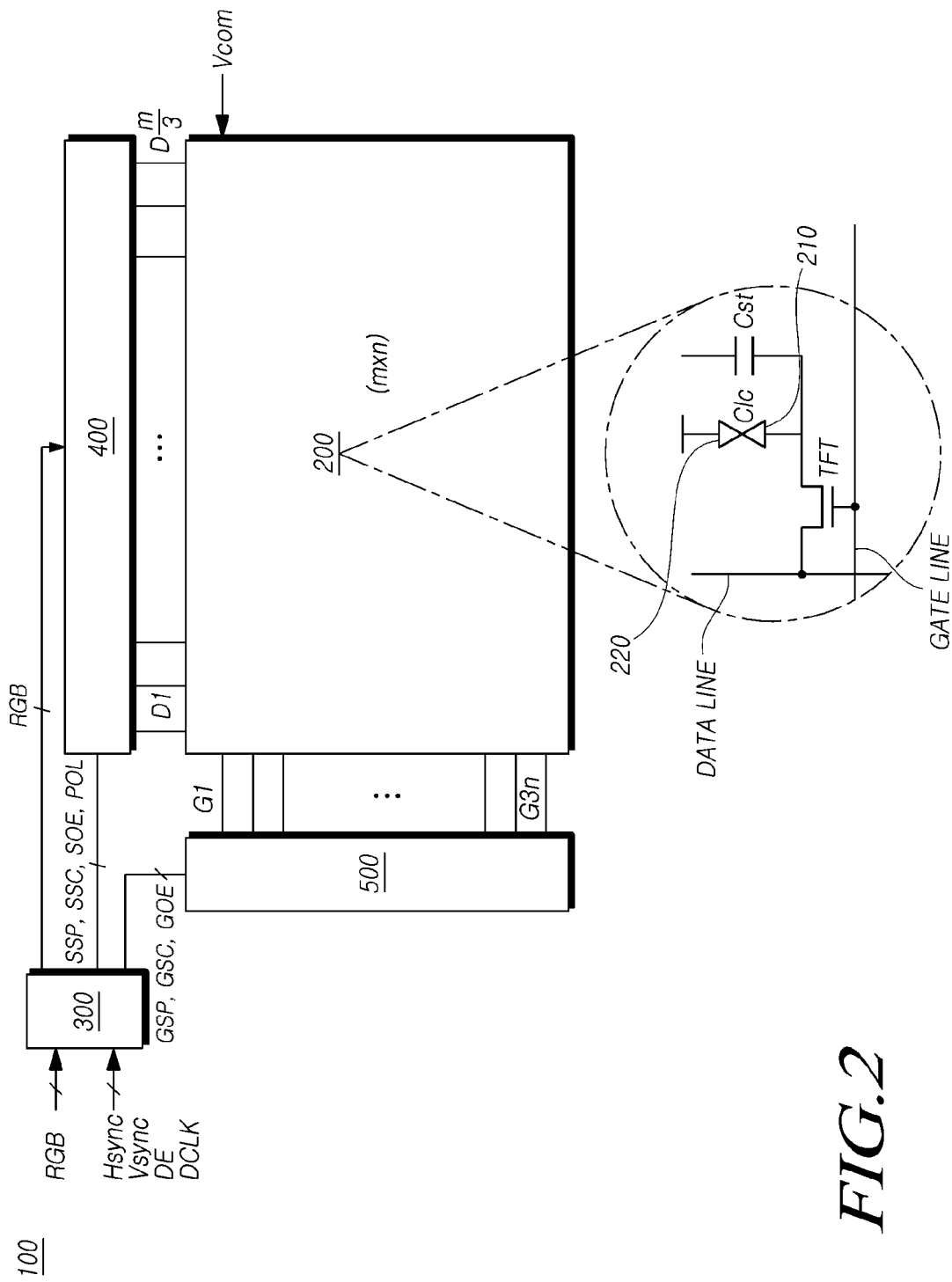
FIG. 2 is a block diagram illustrating an LCD device according to an aspect of the disclosure.

FIG. 2 is a block diagram illustrating a liquid crystal display device according to an aspect of the present disclosure.

Referring to FIG. 2, an LCD device 100 according to an aspect of the disclosure may include an LCD panel 200, a controller 300, a data drive circuit 400, and a gate drive circuit 500.

The LCD panel 200 has a liquid crystal layer disposed between two substrates.

The LCD panel 200 includes m×n liquid crystal cells Clc (where m is a natural number that is a multiple of 3 and n is a natural number.) arranged in a matrix form in an intersecting structure of m/3 data lines D1 to Dm/3 and 3n gate lines G1 to G3n. The m×n liquid crystal cells Clc are arranged on the first substrate of the liquid crystal display panel 200 as illustrated FIG. 1.

Each liquid crystal cell Clc is connected to the TFT and driven by an electric field between the pixel electrode 210 and the common electrode 220.

On a second substrate of the LCD panel 200, a black matrix and a color filter are disposed. In a vertical electric field driving mode, such as a twisted nematic (TN) mode and a vertical alignment (VA) mode, the common electrode 220 is disposed on the second substrate. On the other hand, in a horizontal electric field driving mode or a transverse electric field driving mode, such as an in-plane switching (IPS) mode and a fringe field switching (FFS) mode, the common electrode 220 is disposed on the first substrate together with the pixel electrode 210.

The LCD panel 200 includes red, white, blue, and green liquid crystal cells (hereinafter, referred to as an "R liquid crystal cell," a "W liquid crystal cell," a "B liquid crystal cell", and a "G liquid crystal cell") in m×n regions (where m is a natural number that is a multiple of 3 and n is a natural number.) in which m/3 data lines D1 to Dm/3 and 3n gate lines G1 to G3n intersect each other. The R liquid crystal cell is a liquid crystal cell in which a red color filter is disposed corresponding to a specific pixel electrode 210. Likewise, the B liquid crystal cell and the G liquid crystal cell are liquid crystal cells in which blue and green color filters are arranged corresponding to specific pixel electrodes 210, respectively. The W liquid crystal cell is a liquid crystal cell in which a color filter is not arranged corresponding to a specific pixel electrode 210.

On each of the first substrate and the second substrate of the LCD panel 200, a polarizing plate is attached, and an alignment film for setting a pre-tilt angle of the liquid crystal is disposed.

The controller 300 generates a data control signal (DSC) for controlling the operating timing of a data drive circuit 400 and a gate control signal (GCS) for controlling the operating timing of a gate drive circuit 500, using timing signals, such as a horizontal synchronizing signal Hsync, a vertical synchronizing signal Vsync, a data enable signal DE, and a dot clock DCLK supplied from a system (not illustrated).

The data control signal includes a source start pulse SSP that indicates a sampling start point of digital video data RGB in the data drive circuit 400; a source sampling clock SSC that indicates a latch operation of the digital video data RGB in the data drive circuit 400 on the basis of a rising edge or a falling edge; a source output enable signal SOE that indicates the output of the data driving circuit 400; a polarity control signal POL that indicates the polarity of a data voltage to be supplied to the liquid crystal cells Clc of the LCD panel 200; and so on.

The gate control signal includes a gate start pulse GSP that indicates a start horizontal line where scan is started during one vertical period in which one screen is displayed; a gate shift clock signal GSC that is a timing control signal input to a shift register in the gate drive circuit 500 so as to sequentially shift the gate start pulse GSP and is generated with a pulse width corresponding to an ON period of the TFT; a gate output enable signal GOE that indicates the output of the gate drive circuit 500; and so on.

In addition, the controller 300 rearranges the digital video data RGB supplied from the system according to the resolution of the LCD panel 200, and supplies the digital video data RGB to the data drive circuit 400.

The data drive circuit 400 latches the digital video data RGB under the control of the control unit 300. In addition, the data drive circuit 400 converts the digital video data RGB to an analog positive polarity/negative polarity gamma voltage according to a polarity control signal POL, thereby generating a positive polarity/negative polarity analog data voltage and supplying the data voltage to the data lines D1 to Dm/3.

To this end, the data drive circuit 400 may include a plurality of data drive ICs.

The gate drive circuit 500 generates a scan pulse for selecting a horizontal line of the LCD panel 200 to which the analog data voltage is to be supplied under the control of the controller 300, and sequentially supplies the scan pulse to the gate lines G1 to G3n.

To this end, the gate drive circuit 500 may include a plurality of gate drive ICs, each of which includes a shift register, a level shifter configured to convert an output signal of the shift register to have a swing width suitable for driving the TFT of the liquid crystal cell Clc, and an output circuit connected between the level shifter and a gate line.

In addition, a method of integrating a gate drive circuit 500 in the LCD panel 200, that is, a gate-in-panel (GIP) method of embedding a gate drive circuit 500 in the LCD panel 200 may be applied. At this time, the gate drive circuit 500 may be disposed on the right and left sides of the pad region of the first substrate in the GIP method.

Arrangement of Liquid Crystal Cells

The LCD panel 200 shown in FIG. 2 includes two or more R liquid crystal cells, G liquid crystal cells, B liquid crystal cells, and W liquid crystal cells. At least a portion of the LCD panel 200 of FIG. 2 includes liquid crystal cells, which are repeated in a 4×2 arrangement in the data line direction and the gate line direction as represented in Equation 1 below.

$$\begin{bmatrix} X1 & X2 \\ X3 & X4 \\ X2 & X1 \\ X4 & X3 \end{bmatrix} \quad \text{[Equation 1]}$$

In Equation 1, each of X1, X2, X3, and X4 represents one of an R liquid crystal cell, a W liquid crystal cell, a B liquid crystal cell, and a G liquid crystal cell, which have different color filters, respectively.

As described above, the R liquid crystal cell, the B liquid crystal cell, and the G liquid crystal cell are liquid crystal cells in which red, blue, and green color filters are disposed corresponding to specific pixel electrodes 210, respectively. The W liquid crystal cell is a liquid crystal cell in which a color filter is not arranged corresponding to a specific pixel electrode 210.

The LCD panel 200 includes at least four liquid crystal cells, which are arranged in each of m×n regions where m/3 data lines D1 to Dm/3 and 3n gate lines G1 to G3n intersect, and red, white, blue, and green color filters, which are disposed on the second substrate corresponding to the liquid crystal cells, respectively.

At this time, at least some of the color filters may be repeated in an arrangement of 4×2 color filters in the data line direction and the gate line direction according to Equation 1A.

$$\begin{bmatrix} X1 & X2 \\ X3 & X4 \\ X2 & X1 \\ X4 & X3 \end{bmatrix} \quad \text{[Equation 1A]}$$

In Equation 1A, the horizontal direction is the data line direction, the vertical direction is the gate line direction, and X1, X2, X3, and X4 indicate that the colors of the color filters are red, white, blue, and green, respectively.

Since four liquid crystal cells including the W liquid crystal cell constitute one pixel, the image quality can be improved and a driving voltage can be lowered. In addition, since the 4×2 arrangement of color filters is repeated in the data line direction and the gate line direction according to Equations 1 and 1A, in the LCD device 100 and the LCD panel 200, the number of data drive ICs used for the data driver can be reduced by reducing the number of data lines to m/3 data lines D1 to Dm/3.

Hereinafter, descriptions will be made of the case where X1, X2, X3, and X4 respectively represent a W liquid crystal cell, a G liquid crystal cell, a B liquid crystal cell, and an R liquid crystal cell, as an example.

Figure 3:
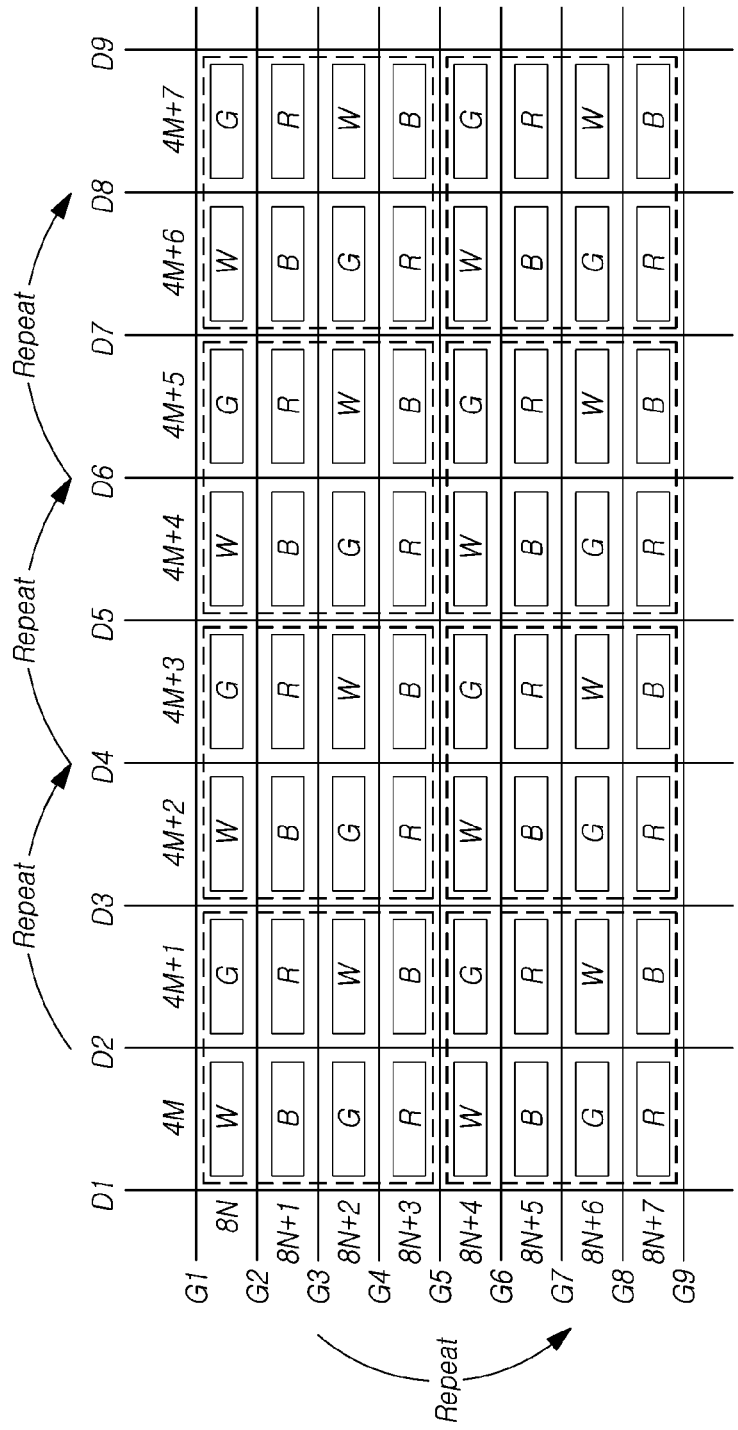
FIG. 3 is a view illustrating an example of the arrangement of some liquid crystal cells in the LCD panel of FIG. 2.

FIG. 3 is a schematic view illustrating an example of the arrangement of some of the liquid crystal cells in the LCD panel of FIG. 2.

Referring to FIG. 3, W liquid crystal cells and G liquid crystal cells are sequentially and alternately arranged in the (8N)-th horizontal line, and B liquid crystal cells and R liquid crystal cells are sequentially and alternately arranged in the (8N+1)-th horizontal line. That is, in the (8N)-th horizontal line and the (8N+1)-th horizontal line, W liquid crystal cells and G liquid crystal cells are arranged in the upper horizontal line, and B liquid crystal cells and R liquid crystal cells are disposed below the W liquid crystal cells and the G liquid crystal cells, respectively. As a result, in the (8N)-th horizontal line and the (8N+1)-th horizontal line, WGBR liquid crystal cells are arranged in 2×2 arrangement structures.

G liquid crystal cells and W liquid crystal cells are sequentially and alternately arranged in the (8N+2)-th horizontal line, and R liquid crystal cells and B liquid crystal cells are sequentially and alternately arranged in the (8N+3)-th horizontal line. That is, in the (8N+2)-th horizontal line and the (8N+3)-th horizontal line, G liquid crystal cells and W liquid crystal cells are arranged in the upper horizontal line, and R liquid crystal cells and B liquid crystal cells are disposed below the G liquid crystal cells and the W liquid crystal cells, respectively. As a result, in the (8N+2)-th horizontal line and the (8N+3)-th horizontal line, GWRB liquid crystal cells are arranged in 2×2 arrangement structures.

The 4×2 arrangement structures of liquid crystal cells in the (8N+4)-th to (8N+7)-th horizontal lines may be the same as the 4×2 arrangement structures of liquid crystal cells in the (8N)-th to 8(N+1)-th horizontal lines. The 4×2 arrangement structure of liquid crystal cells in the (8N)-th to (8N+1)-th horizontal lines may also be repeated, as a reference unit, in the horizontal lines of the other vertical lines.

Connection Structure of Liquid Crystal Cells with Gate Lines

In at least a portion of the LCD panel 200 of FIG. 2, 8×4 liquid crystal cells in the data line direction and the gate line direction may be repeated with connection structures with gate lines, as will be described later. The 8×4 liquid crystal cells in the data line direction and the gate line direction may form a structure in which the 4×2 arrangement structures of liquid crystal cells in the data line direction and the gate line direction are repeated four times to be adjacent to each other, as in Equation 1.

Figure 4A:
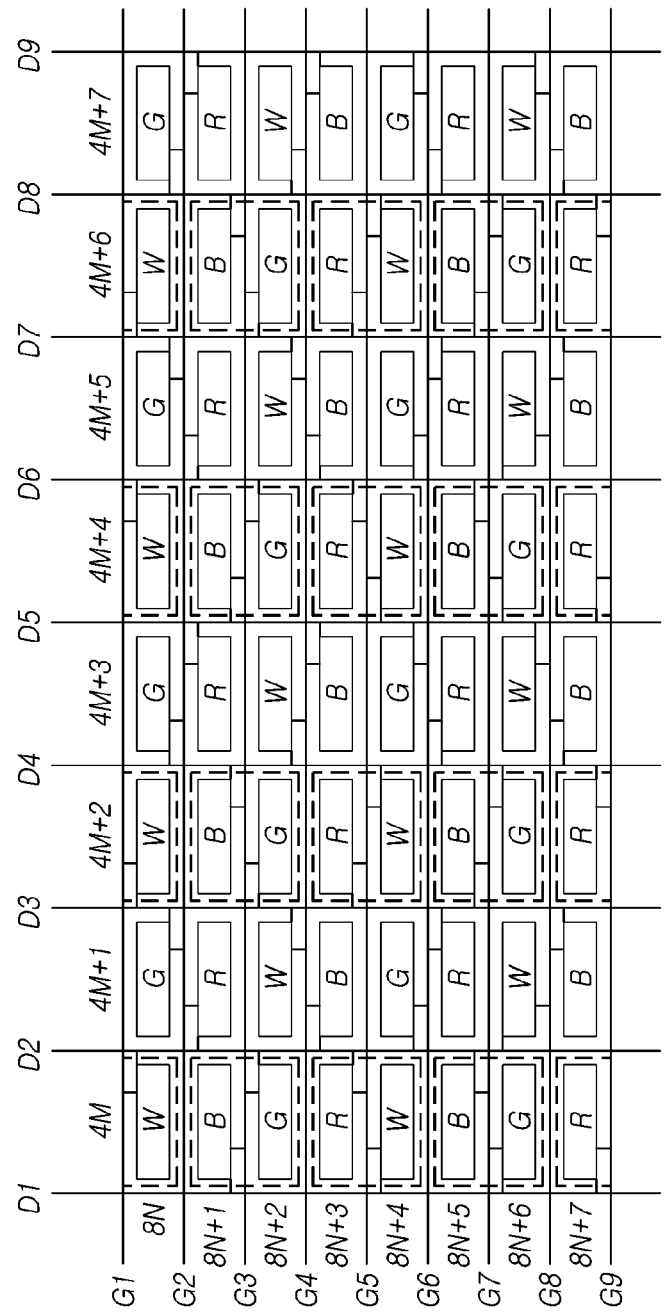
FIGS. 4A and 4B are schematic views each illustrating an example of a connection structure between gate lines and liquid crystal cells in the LCD panel of FIG. 2.
Figure 4B:
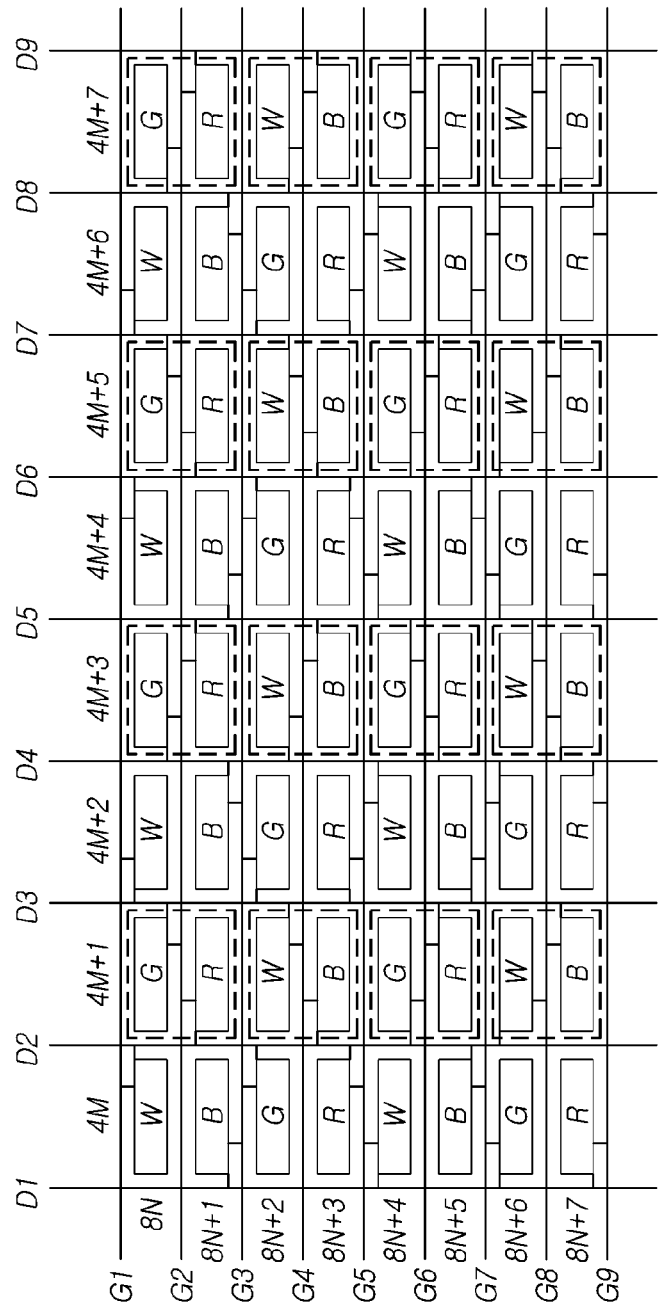

FIGS. 4A and 4B are schematic views each illustrating an example of a connection structure between gate lines and liquid crystal cells of the LCD panel of FIG. 2.

As illustrated in FIG. 4A, two liquid crystal cells above and below each of the odd-numbered horizontal lines 8N, 8N+2, 8N+4, and 8N+6 are commonly connected to odd-numbered gate lines G1, G3, G5, and G7. Two liquid crystal cells above and below each of the odd-numbered horizontal lines 8N, 8N+2, 8N+4, and 8N+6 commonly connected to the odd-numbered gate lines G1, G3, G5, and G7 are connected to two data lines on the left and right thereof, respectively. The connection structure of liquid crystal cells above the first gate line G1 is the same as the connection structure of the other 4×2 liquid crystal cells below the seventh gate line G7.

As illustrated in FIG. 4B, two liquid crystal cells above and below each of the even-numbered horizontal lines 8N, 8N+3, 8N+5, and 8N+7 are commonly connected to each of the even-numbered gate lines G2, G4, G6, and G8. Two liquid crystal cells above and below each of the even-numbered horizontal lines 8N, 8N+3, 8N+5, and 8N+7 commonly connected to the even-numbered gate lines G2, G4, G6, and G8 are connected to two data lines on the left and right thereof, respectively.

As illustrated in FIGS. 4A and 4B, the right data line connected to one of two liquid crystal cells above and below each of the odd-numbered horizontal lines 8N, 8N+2, 8N+4, and 8N+6 commonly connected to the odd-numbered gate lines G1, G3, G5, and G7 may be the same line as the left data line connected to one of two liquid crystal cells above and below each of the even-numbered horizontal lines 8N+1, 8N+3, 8N+5, and 8N+7 commonly connected to the even-numbered gate lines G2, G4, G6, and G8.

For example, the right data line connected to the B liquid crystal cell below the third horizontal line 8N+2 commonly connected to the third gate line G3 may be the third data line D3, which is the same as the left data line connected to the W liquid crystal cell above the second horizontal line 8N+1 commonly connected to the fourth gate line G4.

As described above, since the liquid crystal cells are connected to m/3 data lines and 3n gate lines by the connection structure of the gate lines of the liquid crystal cells, the number of data lines in the LCD device 100 and the LCD panel 200 is reduced, so that the number of data drive ICs used for the data driver can be reduced.

Connection Structure of Liquid Crystal Cells with Data Lines

Two liquid crystal cells above and below the (Nb)-th (where b is a natural number of 1 to 8 in FIGS. 5A and 5B) horizontal line commonly connected to the (Ga)-th (where a is a natural number of 1 to 8 in FIGS. 5A and 5B) gate line are connected to two data lines on the left and right sides thereof, respectively. Conversely, two liquid crystal cells above and below the same (Nb)-th horizontal line commonly connected to the (Ga+2)-th gate line are connected to two data lines on the right and left thereof, respectively.

In summary, four liquid crystal cells sequentially arranged in the (Nb)-th horizontal line commonly connected to the (Ga)-th gate line and the (Ga+2)-th gate line are connected to the data lines in the order of left, right, right, and left, respectively. Hereinafter, the connection relationship of the four liquid crystal cells, which are respectively connected to the data lines in the order of left, right, right, and left, with the data lines will be referred to as an "'A' connection relationship".

Two liquid crystal cells above and below the (Nd)-th (where d is a natural number of 1 to 8 in FIGS. 5A and 5B) horizontal line commonly connected to the (Gc)-th (where c is a natural number of 1 to 8 in FIGS. 5A and 5B) gate line are connected to two data lines on the left and right thereof, respectively. Conversely, two liquid crystal cells above and below the (Nd)-th horizontal line commonly connected to the (Gc+2)-th gate line are connected to the two data lines on the left and right thereof, respectively.

In summary, four liquid crystal cells sequentially arranged in the (Nd)-th horizontal line commonly connected to the (Gc)-th gate line and the (Gc+2)-th gate line are connected to the data lines in the order of right, left, left, and right, respectively. Hereinafter, the connection relationship of the four liquid crystal cells, which are connected to the respective data lines in the order of right, left, left, and right, with the data lines will be referred to as a "'B' connection relationship".

Figure 5A:
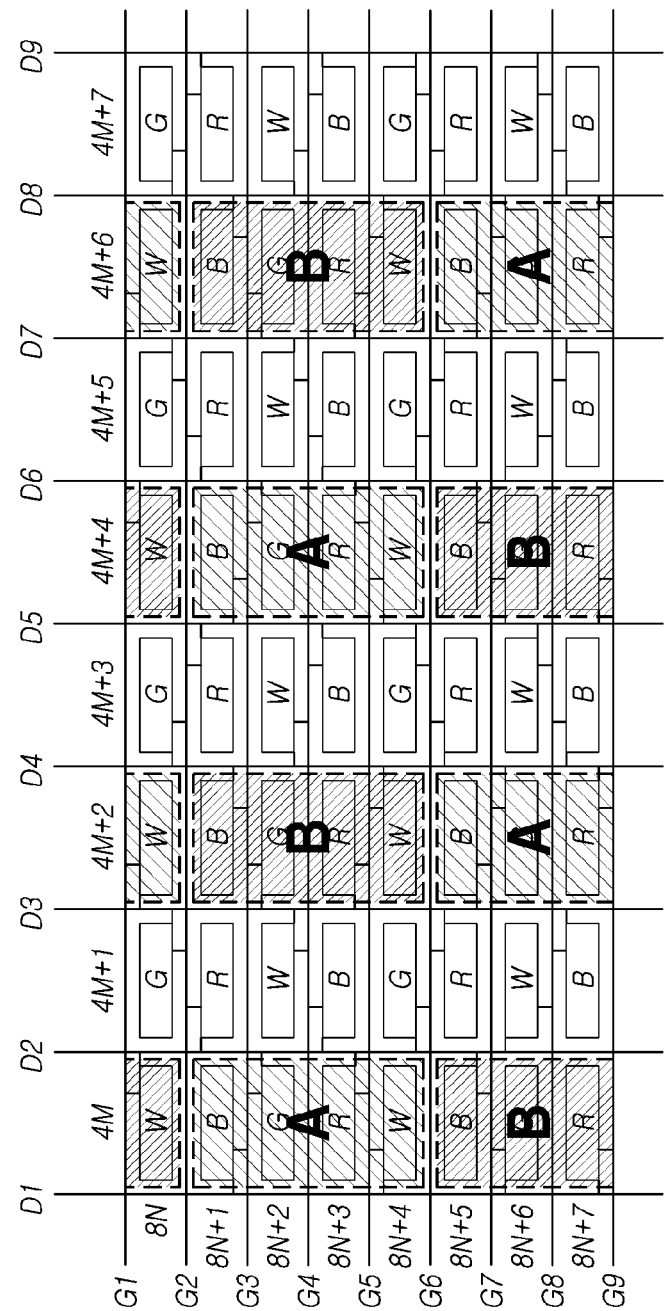
FIGS. 5A and 5B are schematic views each illustrating an example of a connection structure of some liquid crystal cells with data lines in the LCD panel of FIG. 2.
Figure 5B:
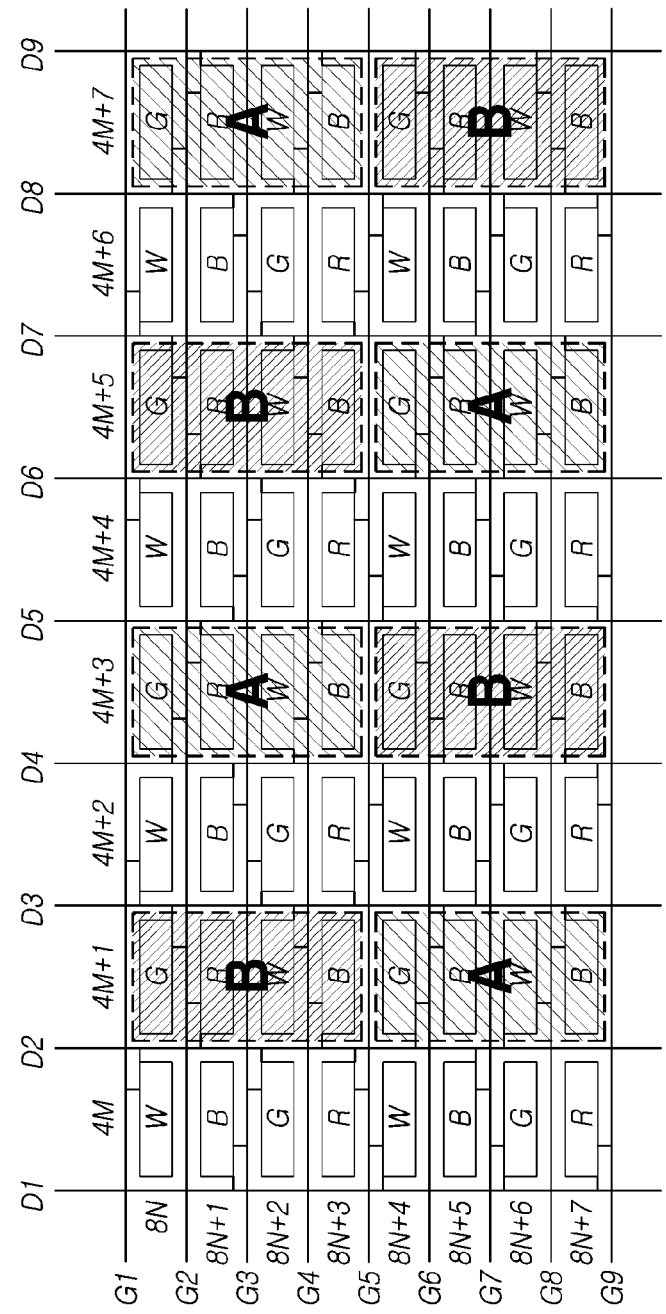

FIGS. 5A and 5B are schematic views each illustrating an example of a connection structure of some liquid crystal cells with data lines in the LCD panel of FIG. 2.

Referring to FIG. 5A, the connection relationship of four liquid crystal cells sequentially arranged in the first vertical line 4M of the third and fifth gate lines G3 and G5 with the data lines is the "A" connection relationship. The connection relationship of four liquid crystal cells sequentially arranged in the third vertical line 4M+2 of the third and fifth gate lines G3 and G5 with the data lines is the "B" connection relationship.

For example, the B and G liquid crystal cells above and below the first vertical line 4M commonly connected to the third gate line G3 are connected to the first data line D1 on the left and the second data line D2 on the right, respectively. Conversely, the R and W liquid crystal cells above and below the same first vertical line 4M commonly connected to the fifth gate line G5 are connected to the second data line D2 on the right and the first data line D1 on the left, respectively.

The B and G liquid crystal cells above and below the third vertical line 4M+2 commonly connected to the third gate line G3 are connected to the fourth data line D4 on the right and the third data line D3 on the left, respectively. Conversely, the R and W liquid crystal cells above and below the same third vertical line 4M+2 commonly connected to the fifth gate line G5 are connected to the third data line D3 on the left and the fourth data line D4 on the right, respectively.

The connection relationship of four liquid crystal cells sequentially arranged in the first vertical line 4M of the seventh and first gate lines G7 and G1 with the data lines is the "B" connection relationship. The connection relationship of four liquid crystal cells sequentially arranged in the third vertical line 4M+2 of the seventh and first gate lines G7 and G1 with the data lines is the "A" connection relationship.

In summary, 8×4 liquid crystal cells connected to odd-numbered gate lines in two adjacent odd-numbered vertical lines in at least a portion of the LCD panel 200 of FIG. 2 have a connection structure of data lines represented by Equation 2 below.

$$\begin{pmatrix} A & B \\ B & A \end{pmatrix} \quad \text{Equation 2}$$

In Equation 2, "A" and "B" mean that the connection relationships of the four liquid crystal cells with the data lines are the above-described "A' connection relationship and "B" connection relationship, respectively.

Referring to FIG. 5B, the connection relationship of four liquid crystal cells sequentially arranged in the second vertical line 4M+1 of the fourth and sixth gate lines G4 and G6 with the data lines is the "B" connection relationship. The connection relationship of four liquid crystal cells sequentially arranged in the fourth vertical line 4M+3 of the fourth and sixth gate lines G4 and G6 with the data lines is the "A" connection relationship.

The connection relationship of four liquid crystal cells sequentially arranged in the second vertical line 4M+1 of the eighth and second gate lines G8 and G2 with the data lines is the "A" connection relationship. The connection relationship of four liquid crystal cells sequentially arranged in the fourth vertical line 4M+3 of the eighth and second gate lines G8 and G2 with the data lines is the "B" connection relationship.

In summary, 8×4 liquid crystal cells connected to even-numbered gate lines in two adjacent even-numbered vertical lines in at least a portion of the LCD panel 200 of FIG. 2 have a connection structure of data lines represented by Equation 3 below.

$$\begin{pmatrix} B & A \\ A & B \end{pmatrix} \quad \text{Equation 3}$$

In Equation 3, "A" and "B" mean that the connection relationship of the four liquid crystal cells with the data lines are the above-described "A' connection relationship and "B" connection relationship, respectively.

As described above, since the liquid crystal cells are connected to m/3 data lines and 3n gate lines by the connection structure of the gate lines of the liquid crystal cells and the connection relationship of the liquid crystal cells with the data lines, the number of data lines in the LCD device 100 and the LCD panel 200 is reduced, so that the number of data drive ICs used for the data driver can be reduced.

Further, for the same reason, since the LCD device 100 and the LCD panel 200 can secure a sufficient charging rate and can reduce the amount of heat generated therefrom, despite of a shortened charging time according to either an enlargement in size or a high resolution.

Method of Charging Liquid Crystal Cells According to Inversion Method

Figure 6A:
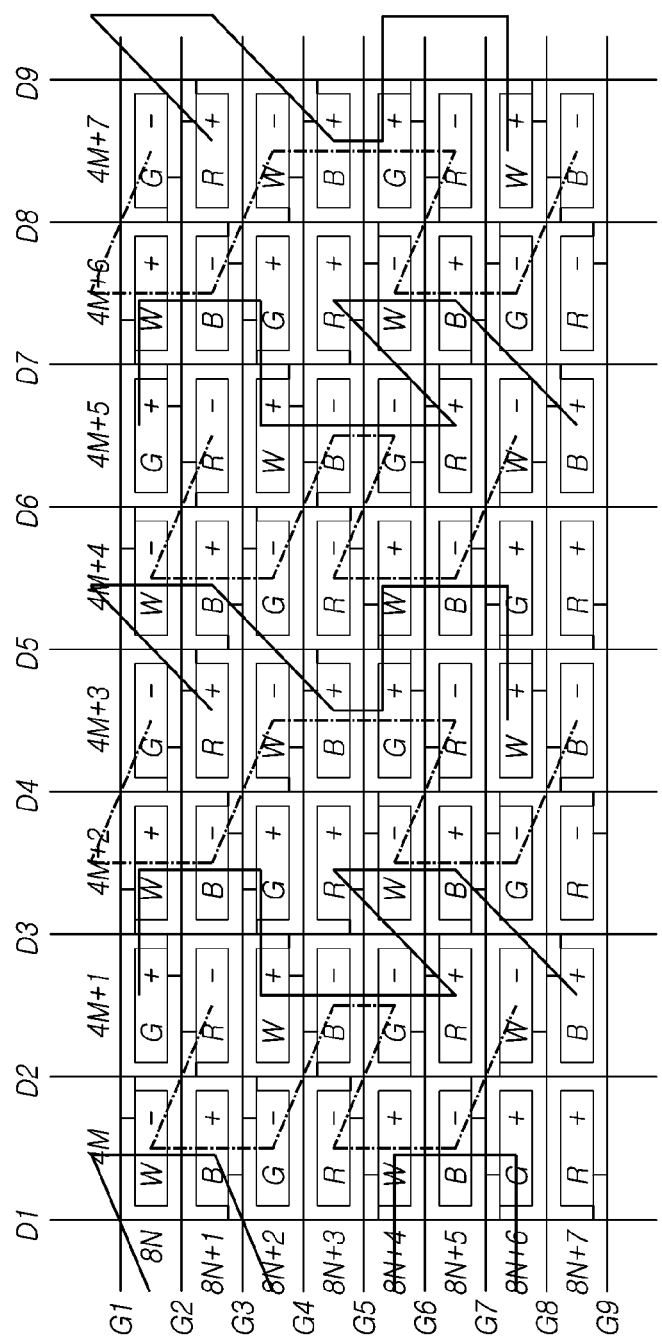
FIGS. 6A and 6B are schematic views each conceptually illustrating a method of charging liquid crystal cells according to an inversion method of the LCD device of FIG. 2.
Figure 6B:
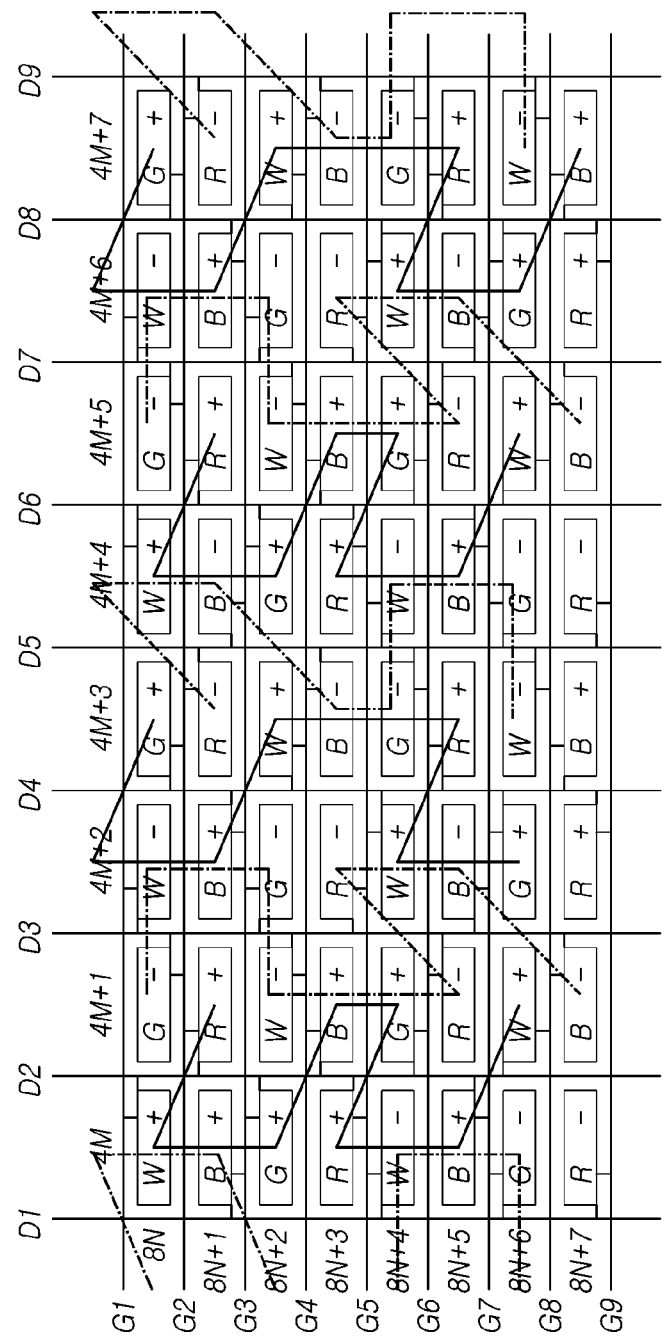

FIGS. 6A and 6B are schematic views each conceptually illustrating a method of charging liquid crystal cells according to an inversion method of the LCD device of FIG. 2.

In FIGS. 6A and 6B, R (−), W (−), B (−), and G (−) mean that each liquid crystal cell is low-charged. R (+), W (+), B (+), and G (+) mean that each liquid crystal cell is high-charged. The above-described low charge and high charge are the relative charge amounts of pixel electrodes in relation to a common electrode.

Referring to FIGS. 6A and 6B, the LCD device 100 according to an aspect of the present disclosure drives m×n liquid crystal cells arranged in the LCD panel 200 using m/3 data lines and 3n gate lines.

The LCD device 100 according to an aspect can drive the LCD panel 200 in a column inversion method.

When a DC voltage is applied across the two ends of the liquid crystal (e.g., common electrode and pixel electrode) in each liquid crystal cell Clc, the liquid crystal is polarized. By periodically reversing the polarized state, it is possible to prevent ionic impurities from being fixed. Inversing the polarization state as described above is referred to as inversion. That is, a liquid crystal is polarized by a potential difference between the two ends having relatively positive (+) and negative (−) in potential values. Therefore, by periodically inverting the relative values using DC power supplied from a system, it is possible to obtain a polarization inversion effect similar to that obtained when applying AC power to the liquid crystal.

Column inversion driving drives liquid crystal cells Clc connected to neighboring data lines one by one in such a manner that the polarities of the liquid crystal cells Clc are inverted while the states of the liquid crystal cells Clc are inverted frame by frame.

Since the LCD panel 200 is driven by the column inversion method, liquid crystal cells connected to one data line are connected to the respective gate lines to be charged with data voltage of the same polarity supplied through the data lines.

For example, in a specific frame, a positive polarity data voltage may be supplied on the odd-numbered data lines D1, D3, D5, and D7, and a negative polarity data voltage may be supplied on the even-numbered data lines D2, D4, D6, and D8. In the next frame, conversely, a negative polarity data voltage may be supplied on the odd-numbered data lines D1, D3, D5, and D7, and a positive polarity data voltage may be supplied on the even-numbered data lines D2, D4, D6, and D8.

Therefore, the liquid crystal cells sharing the odd-numbered data lines D1, D3, D5, and D7 are charged with the same polarity in synchronization with the supply timing of the scan pulses of the corresponding gate lines. The liquid crystal cells sharing the even-numbered data lines D2, D4, D6, and D8 may be charged with the same polarity in synchronization with the supply timing of the scan pulses of the corresponding gate lines.

Among the liquid crystal cells arranged in only two data lines, e.g. the adjacent vertical line 4M−1 (not illustrated in the drawing) and the first vertical line 4M in a specific frame, the R, B, B, W, G, G, W, and R liquid crystal cells shared by the first data line D1 are sequentially charged with the positive polarity in synchronization with the supply timing of the scan pulses from the gate lines G3, G5, G7, and G9.

Among the liquid crystal cells arranged in the first vertical line 4M and the second vertical line 4M+1, the R, G, B, R, G, B, and W liquid crystal cells shared by the second data line D2 are sequentially charged with the negative polarity in synchronization with the supply timing of the scan pulses from the gate lines G1 to G8.

In addition, since the LCD panel 200 is driven in the column inversion method, the LCD device 100 and the LCD panel 200 can improve the image quality, secure a sufficient charging rate, and reduce the amount of heat generated therefrom, despite of shortened charging time according to either an enlargement in size or a high resolution.

In summary, the LCD display 100 according to an aspect may further include a W liquid crystal cell together with the RGB liquid crystal cells. In addition, in the LCD device 100 according to the aspect, the 4×2 arrangement of liquid crystal cells in the data line direction and the gate line direction represented in Equation 1 described above may be repeated.

As illustrated in FIGS. 4A and 4B, in at least a portion of the LDC device 100 according to an aspect, 8×4 liquid crystal cells in the data line direction and the gate line direction may include the above-described gate line connection structure.

In the 8×4 liquid crystal cells, two liquid crystal cells above and below each of the odd-numbered vertical lines 8N, 8N+2, 8N+4, and 8N+6 are commonly connected to the odd-numbered gate lines G1, G3, G5 and G7, and two liquid crystal cells above and below each of the even-numbered vertical lines 8N+1, 8N+3, 8N+5, and 8N+7 may be commonly connected to the even-numbered gate lines G2, G4, G6, and G8.

The 8×4 liquid crystal cells connected to the odd-numbered gate lines in the two adjacent odd-numbered vertical lines in the LCD device 100 according to an aspect may have the data line connection structure represented in Equation 2 above, and the 8×4 liquid crystal cells connected to even-numbered gate lines in two adjacent even-numbered vertical lines may have the data line connection structure represented in Equation 3 above.

Meanwhile, the LCD device 100 according to one aspect may drive m×n liquid crystal cells arranged in the LCD panel 200 in the column inversion method using m/3 data lines and 3n gate lines.

In the liquid crystal display device 100 and the liquid crystal display panel 200 according to the above-described aspect, the number of data lines can be reduced, and as a result, the number of data drive ICs used in a data driver can be reduced.

In addition, the LCD device 100 and the LCD panel 200 can improve the image quality, secure sufficient charging rate, and reduce the amount of heat generated therefrom, despite of shortened charging time according to either an enlargement in size or a high resolution.

While the present disclosure has been described in detail with reference to aspects thereof in the foregoing detailed description, it will be clearly understood by a person ordinarily skilled in the art that the present disclosure can be variously modified and changed without departing from the spirit and scope of the present disclosure defined in the accompanying claims. Therefore, the technical scope of the present disclosure shall not be limited to the contents described in the detailed description of the specification, but shall be determined on the basis of the claims.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the aspects disclosed in the present disclosure are intended to illustrate the scope of the technical idea of the present disclosure, and the scope of the present disclosure is not limited by the aspect. The scope of the present disclosure shall be construed on the basis of the accompanying claims in such a manner that all of the technical ideas included within the scope equivalent to the claims belong to the present disclosure.

What is claimed is:

1. A liquid crystal display device, comprising:
a liquid crystal display panel including red, white, blue, and green liquid crystal cells in m x n regions where m is a natural number that is a multiple of 3 and n is a natural number;
m/3 data lines and 3n gate lines intersecting each other at the liquid crystal display panel, wherein the liquid crystal cells are arranged in a pattern of 4×2 to a data line direction and a gate line direction and the pattern is repeated in at least a portion of the liquid crystal display panel according to Equation 1, $$\begin{bmatrix} X1 & X2 \\ X3 & X4 \\ X2 & X1 \\ X4 & X3 \end{bmatrix} \qquad \text{[Equation 1]}$$

wherein, in Equation 1, the data line direction is a vertical direction, the gate line direction is a horizontal direction, and X1, X2, X3, and X4 indicate that a color of a color filter is one of red, white, blue, and green; and
a controller configured to control driving the liquid crystal cells through the data lines and the gate lines,
wherein the liquid crystal cells are arranged in a pattern of 8×4 to the data line direction and the gate line direction and the pattern is repeated in the at least a portion of the liquid crystal display panel, and
among the 8×4 liquid crystal cells, two liquid crystal cells above and below each of odd-numbered vertical lines are commonly connected to an odd-numbered gate line, wherein one of the two liquid crystal cells above and below each of odd-numbered vertical lines is connected to one of two data lines located on the left and right thereof and the other of two liquid crystal cells is connected to the other of two data lines located on the left and right thereof, and two liquid crystal cells above and below each of even-numbered vertical lines are commonly connected to an even-numbered gate line, wherein one of the two liquid crystal cells above and below each of even-numbered vertical lines is connected to one of two data lines located on the left and right thereof and the other of two liquid crystal cells is connected to the other of two data lines located on the left and right thereof.

2. The liquid crystal display device of claim 1, wherein the 8×4 liquid crystal cells are a four times repetition of adjacent 4*2 liquid crystal cells to the data line direction and the gate line direction.

3. The liquid crystal display device of claim 1, wherein, in the 8×4 liquid crystal cells, liquid crystal cells connected to odd-numbered gate lines in two adjacent odd-numbered vertical lines have a data line connection structure according to Equation 1, $$\begin{pmatrix} A & B \\ B & A \end{pmatrix} \quad \text{[Equation 2]}$$

wherein A represents a connection relationship of four liquid crystal cells, which are respectively connected to data lines in an order of left, right, right, and left, with the data lines, and B represents a connection relationship of four liquid crystal cells, which are respectively connected to data lines in an order of right, left, left, and right, with the data lines.

4. The liquid crystal display device of claim 3, wherein, in the 8×4 liquid crystal cells, liquid crystal cells connected to even-numbered gate lines in two adjacent odd-numbered vertical lines have a data line connection structure according to Equation 3, $$\begin{pmatrix} B & A \\ A & B \end{pmatrix} \quad \text{[Equation 3]}$$

wherein A represents a connection relationship of four liquid crystal cells, which are respectively connected to data lines in an order of left, right, right, and left, with the data lines, and B represents a connection relationship of four liquid crystal cells, which are respectively connected to data lines in an order of right, left, left, and right, with the data lines.

5. The liquid crystal display device of claim 4, wherein the controller controls the liquid crystal cells to be driven by a columnar inversion method through the data lines and the gate lines.

6. A liquid crystal display panel, comprising:
m×n liquid crystal cells respectively arranged in m×n regions where m/3 data lines and 3n gate lines intersect each other on a first substrate, where m is a natural number that is a multiple of 3 and n is a natural number; and
red, white, blue, and green color filters disposed on a second substrate to correspond to the m ×n liquid crystal cells, respectively,
wherein at least some of the color filters are repeated in arrangement pattern of 4×2 color filters to the data line direction and the gate line direction according to Equation 1A, $$\begin{bmatrix} X1 & X2 \\ X3 & X4 \\ X2 & X1 \\ X4 & X3 \end{bmatrix} \quad \text{[Equation 1A]}$$

wherein the data line direction is a vertical direction, the gate line direction is a horizontal direction, and X1, X2, X3, and X4 indicate that the colors of the color filters are red, white, blue, and green, respectively, and
wherein at least some of the liquid crystal cells are repeated in a pattern of 8×4 liquid crystal cells to the data line direction and the gate line direction, and two adjacent liquid crystal cells above and below each of odd-numbered vertical lines among the 8×4 liquid crystal cells are commonly connected to an odd-numbered gate line, wherein one of the two liquid crystal cells above and below each of odd-numbered vertical lines is connected to one of two data lines located on the left and right thereof and the other of two liquid crystal cells is connected to the other of two data lines located on the left and right thereof, and two adjacent liquid crystal cells above and below each of even-numbered vertical lines among the 8×4 liquid crystal cells are commonly connected to an even-numbered gate line, wherein one of the two liquid crystal cells above and below each of even-numbered vertical lines is connected to one of two data lines located on the left and right thereof and the other of two liquid crystal cells is connected to the other of two data lines located on the left and right thereof.

7. The liquid crystal display panel of claim 6, wherein, in the 8×4 liquid crystal cells, the pattern of adjacent 4×2 liquid crystal cells to the data line direction and the gate line direction is a four times repetition.

8. The liquid crystal display panel of claim 6, wherein, in the 8×4 liquid crystal cells, liquid crystal cells connected to odd-numbered gate lines in two adjacent odd-numbered vertical lines have a data line connection structure according to Equation 2, $$\begin{pmatrix} A & B \\ B & A \end{pmatrix} \quad \text{[Equation 2]}$$

wherein A represents a connection relationship of four liquid crystal cells, which are respectively connected to data lines in an order of left, right, right, and left, with the data lines, and B represents a connection relationship of four liquid crystal cells, which are respectively connected to data lines in an order of right, left, left, and right, with the data lines.

9. The liquid crystal display panel of claim 8, wherein, in the 8×4 liquid crystal cells, liquid crystal cells connected to even-numbered gate lines in two adjacent even-numbered vertical lines have a data line connection structure according to Equation 3, $$\begin{pmatrix} B & A \\ A & B \end{pmatrix}. \quad \text{[Equation 3]}$$

10. The liquid crystal display panel of claim 9, wherein the liquid crystal cells are driven by a column inversion method through the data lines and the gate lines.

11. A liquid crystal display panel, comprising:
a plurality of liquid crystal cells in m×n regions where m is a multiple of 3 and n is a natural number;
m/3 data lines and 3n gate lines intersecting each other at the m×n regions of the liquid crystal cells; and
a plurality of red, white, blue and green color filters corresponding to the liquid crystal cells,
wherein at least either the liquid crystal cells or the color filters are arranged in a pattern of 4×2 to a data line direction parallel to a vertical direction and a gate line direction perpendicular to the data line direction and the pattern is repeated in at least a portion of the liquid crystal display panel according to Equation 1, $$\begin{bmatrix} X1 & X2 \\ X3 & X4 \\ X2 & X1 \\ X4 & X3 \end{bmatrix}$$ [Equation 1]

wherein X1, X2, X3, and X4 respectively indicate one of red, white, blue, and green colors of the liquid crystal cells or the color filters, and wherein either the liquid crystal cells or the color filters are arranged in a pattern of 8×4 to the data line direction and the gate line direction and the pattern is repeated in the at least a portion of the liquid crystal display panel, and two adjacent liquid crystal cells above and below each of odd-numbered vertical lines among the 8×4 liquid crystal cells are commonly connected to an odd-numbered gate line, wherein one of the two liquid crystal cells above and below each of odd-numbered vertical lines is connected to one of two data lines located on the left and right thereof and the other of two liquid crystal cells is connected to the other of two data lines located on the left and right thereof, and two adjacent liquid crystal cells above and below each of even-numbered vertical lines are commonly connected to an even-numbered gate line, wherein one of the two liquid crystal cells above and below each of even-numbered vertical lines is connected to one of two data lines located on the left and right thereof and the other of two liquid crystal cells is connected to the other of two data lines located on the left and right thereof.

12. The liquid crystal display device of claim 11, wherein the 8×4 liquid crystal cells are a four times repetition of adjacent 4×2 liquid crystal cells to the data line direction and the gate line direction.

13. The liquid crystal display panel of claim 12, wherein, in the 8×4 liquid crystal cells, liquid crystal cells connected to odd-numbered gate lines in two adjacent odd-numbered vertical lines have a data line connection structure according to Equation 2, $$\begin{pmatrix} A & B \\ B & A \end{pmatrix}$$ [Equation 2]

wherein A represents a connection relationship of four liquid crystal cells, which are respectively connected to data lines in an order of left, right, right, and left, with the data lines, and B represents a connection relationship of four liquid crystal cells, which are respectively connected to data lines in an order of right, left, left, and right, with the data lines.

14. The liquid crystal display panel of claim 12, wherein, in the 8×4 liquid crystal cells, liquid crystal cells connected to even-numbered gate lines in two adjacent even-numbered vertical lines have a data line connection structure according to Equation 3, $$\begin{pmatrix} B & A \\ A & B \end{pmatrix}.$$ [Equation 3]

15. The liquid crystal display panel of claim 14, wherein the liquid crystal cells are driven by a column inversion method through the data lines and the gate lines.

\* \* \* \* \*